Figure 6:
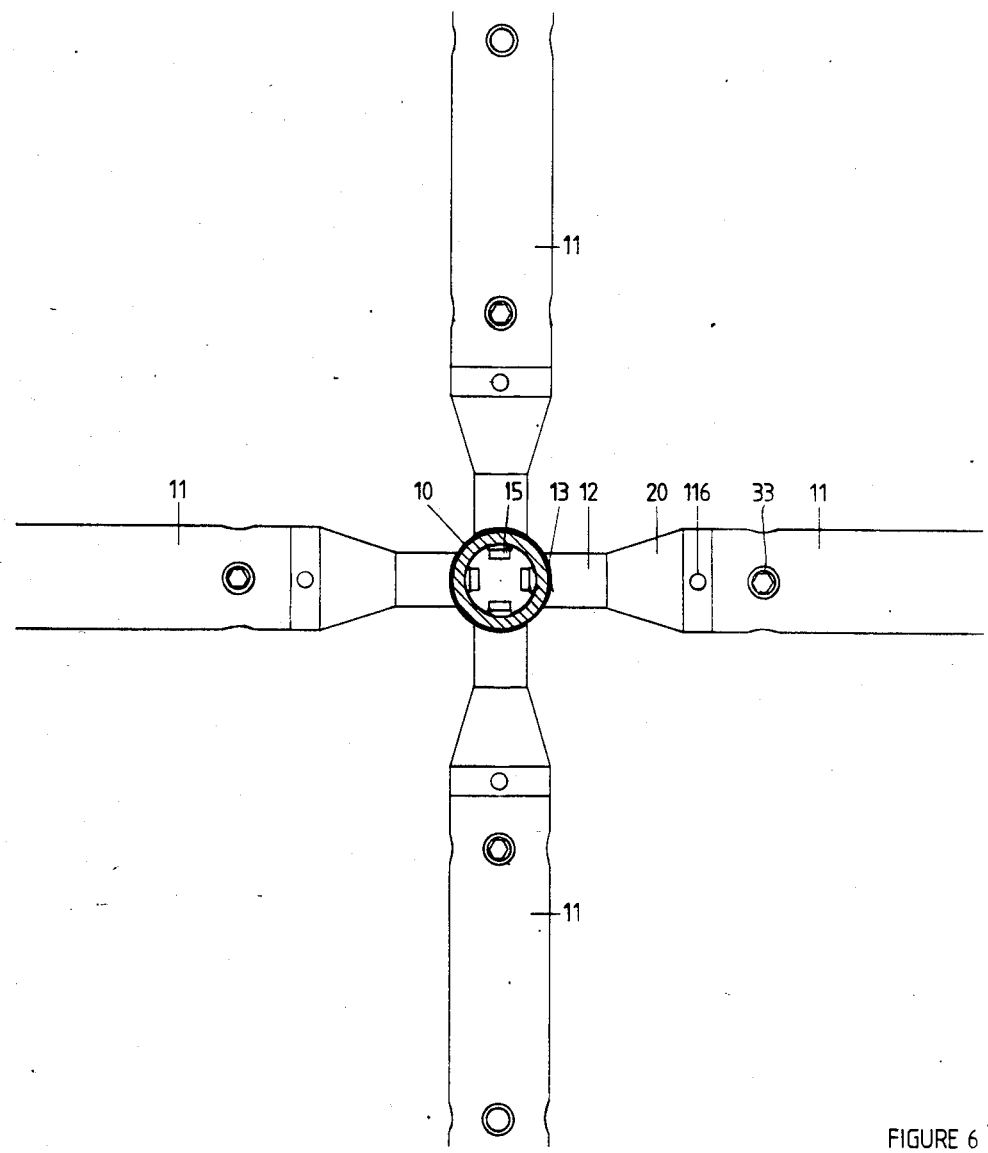

United States Patent [19]

Holt

[11] Patent Number: 4,677,804
[45] Date of Patent: Jul. 7, 1987

[54] DEMOUNTABLE FRAMES

[76] Inventor: Richard E. Holt, 23 Beauchamp Avenue, Leamington Spa, England

[21] Appl. No.: 644,396

[22] Filed: Aug. 27, 1984

[30] Foreign Application Priority Data

Aug. 26, 1983 [GB] United Kingdom ................. 8323093

[51] Int. Cl.$^4$ .............................................. F16B 7/00
[52] U.S. Cl. ....................................... 52/648; 52/646; 403/171; 182/178
[58] Field of Search ................. 52/648, 646, 649–655; 403/171, 176, 177, 201, 187, 256, 247; 182/178, 179

[56] References Cited

U.S. PATENT DOCUMENTS

| 1,554,224 | 9/1925 | McGrath | 52/646 |
| 2,053,462 | 9/1936 | Chaplin | 52/648 |
| 2,242,427 | 5/1941 | Heanue | 403/201 X |
| 3,995,962 | 12/1976 | Mylaeus | 403/171 X |
| 4,142,809 | 3/1979 | Shell | 403/201 |
| 4,235,559 | 11/1980 | Rooklyn | 403/171 X |

FOREIGN PATENT DOCUMENTS

| 1039734 | 10/1953 | France | 403/171 |
| 651503 | 4/1951 | United Kingdom | 403/177 |
| 614185 | 7/1978 | U.S.S.R. | 52/648 |

*Primary Examiner*—William F. Pate, III
*Assistant Examiner*—R. Chilcot
*Attorney, Agent, or Firm*—Solon B. Kemon

[57] ABSTRACT

A demountable frame, for example for furniture, storage or display systems or for space frame construction, in which a structural member extending between two fixed spaced members can be fitted in place by the extension of projections at the ends of the structural member into the spaced members without moving the latter apart, and can be removed by reversing the process.

17 Claims, 9 Drawing Figures

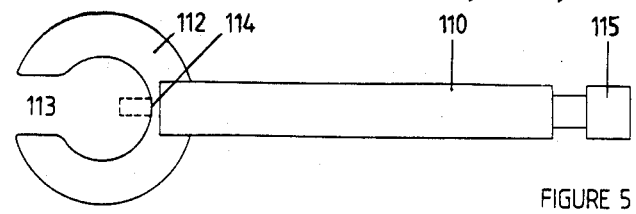
FIGURE 5
FIGURE 1
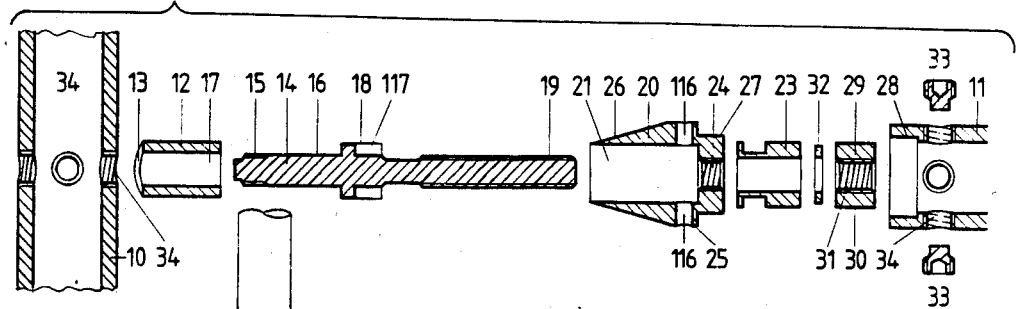
FIGURE 2
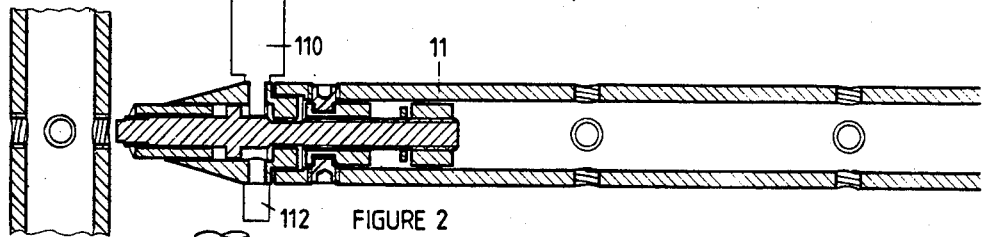
FIGURE 3
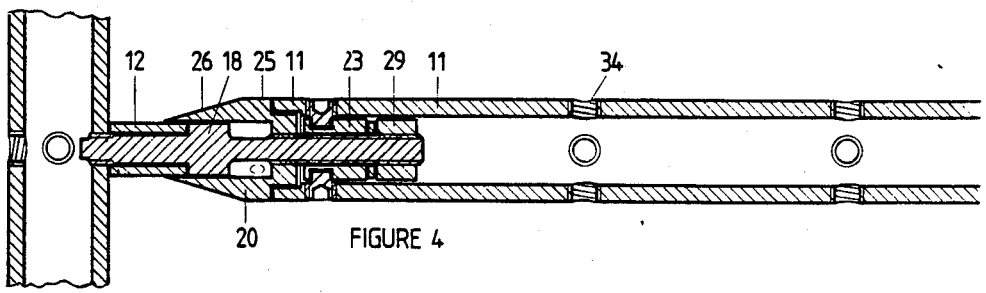
FIGURE 4

DEMOUNTABLE FRAMES

This invention relates to demountable frames and is applicable particularly, but not exclusively, to demountable frames usable for structural systems or assemblies in internal or external construction, as the structure of furniture, storage or display systems, space frame structure and construction.

It is one object of the invention to provide a demountable frame in which a transverse member of the frame can be fitted between or removed from two spaced members without moving the two spaced members apart.

It is a further object of the invention to provide a demountable frame in which a transverse member can be fastened to or removed from another member substantially normal to the transverse member without access to the side of the said another member opposite the transverse member.

According to the invention there is provided a demountable frame including two spaced structural members each provided with an aperture, each of said apertures aligned with and facing the other of said apertures and a transverse structural member extending from one of said spaced members to the other, each end of the transverse member having a projection extending therefrom each projection adapted to enter one of the apertures so as to locate the transverse member to the two spaced members, at least one of said projections being optionally withdrawable and extendable in a direction towards or from the other projection, whereby the transverse member may be fitted between or removed from the two spaced members without moving them apart. The transverse member may be elongate and the apertures may be circular.

Preferably the apertures are threaded and the projections are correspondingly threaded, whereby to fasten the transverse member rigidly to the two spaced members.

Each of the two spaced members may be formed with a row of said apertures, each aligned with and facing one of the apertures on the other of the two spaced members, whereby the transverse member may be located optionally at one of several locations along the two spaced members.

According to another aspect of the invention there is provided a set of components to be assembled into an item of furniture having an aforementioned demountable frame.

The invention is described, by way of example only, with reference to the accompanying drawings, in which:

FIGS. 1 to 4 show in section successive stages in the assembly of two tubes at right angles to each other, according to the invention.

Figure 7:
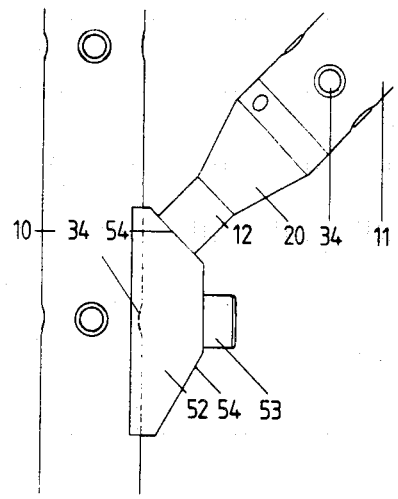
Figure 8:
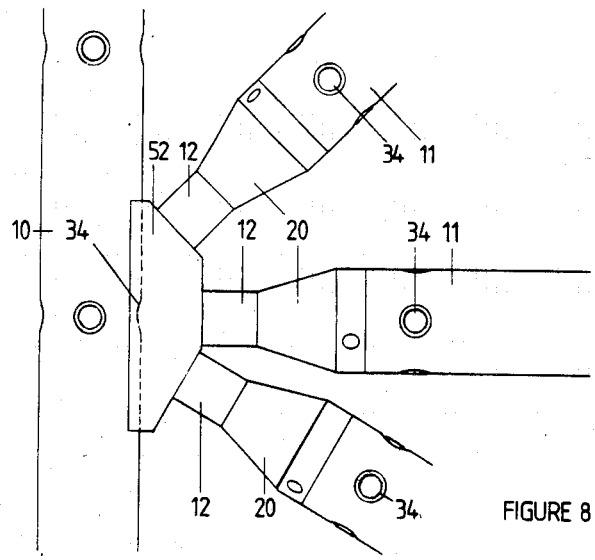
Figure 9:
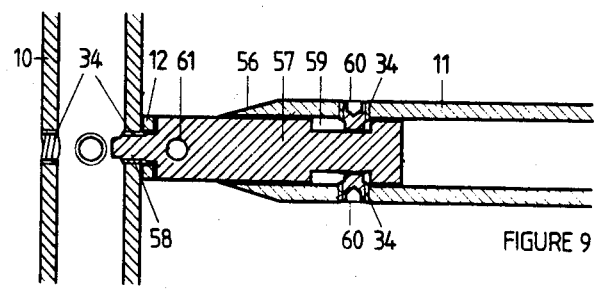

FIG. 5 an elevation of a tool for use in the assembly,

FIG. 6 is a view along the axis of a tube at its junction with four other tubes, FIGS. 7 and 8 show the assembly of two tubes other than at right angles, and FIG. 9 is a transverse section in an axial plane of a further embodiment of the invention.

FIGS. 1 to 4, a thick-walled circular-section steel tube 10 is one of a parallel pair, the other of which is not shown. They are joined by a transverse steel tube 11, preferably but not necessarily of the same diameter and wall thickness as the tube 10.

The components used to join one end of the tube 11 to tube 10 are shown in exploded display in FIG. 1. A sleeve 12 is formed at its left-end with a shape 13 which will fit against the external surface of the tube 10. The shape 13 is part of a right cylinder if the tube 10 is cylindrical. In some embodiments the cross-section of the tube 10 may be polygonal or it may be otherwise multifaceted, in which case the shape 13 is flat. In other embodiments the tube 10 (or an attachment thereto) may be locally of spherical external form in which case the shape 13 is correspondingly part spherical. Where the tube 10 is of other cross-section, such as elliptical or cruciform, the shape 13 will be arranged to fit against it.

A threaded member 14 has a threaded length 15, a plain cylindrical length 16 slidable in the bore 17 of the sleeve 12 and a central cylindrical enlarged portion 18 of the same diameter as the outside of the sleeve 12. The member 14 has a threaded portion 19 of the same thread as the length 15.

A generally cylindrical thimble 20 has a blind bore 21 of the same diameter as the outside of the sleeve 12 and the enlarged portion 18. A transverse bore defining holes 116 extends through the blind bore 21. The blind end of the thimble 20 has a co-axial bore 24 threaded to screw onto the portion 19, of the member 14. The external surface of the thimble comprises a cylindrical length 25 to match the outside diameter of the tube 11, and a conical or other shaped length 26 to blend the length 25 to the sleeve 12. The right-hand end of the thimble 20 is of reduced diameter 27 to fit in a counter bore 28 formed in the end of the tube 11.

A nut 29 has a cylindrical outside 30 to enter the bore of the tube 11. The nut 29 has an internal thread 31 so that it can be screwed onto the threaded portion 19.

Both the tube 10 and tube 11 are formed at equispaced positions along the length thereof with, at each of said positions, four threaded holes 34 equi-spaced circumferentially.

It will be seen that the same thread form is used on the portions 15, 19 of the member 14, in the end 24 of the thimble 20, in the bore 31 of the nut 29, in the holes 34 and on the grub screws 33.

The assembly is completed by a collar 23 having a circumferential groove, an optional washer 32 and grub screws 33 having reduced ends.

The various successive stages of assembling the tube 11 to the tube 10 and fastening them rigidly together is shown in FIGS. 2 to 4. It will be noticed that the relative position of the tubes 10 and 11 in these Figures does not change. Thus the tube 11 can be inserted between the two parallel tubes 10 or removed therefrom without altering the spacing of the tubes 10, thus avoiding the need to disturb any existing frame which included the tubes 10.

The tool shown in FIG. 5 comprises a handle 110 intergral with a collar 111 having a bore 112 of the same diameter as the cylinder 25 and a slot 113 through integral with a collar 112 having a bore of the screwed radially by rotation of a knob 115.

First the portion 19 of the member 14 is screwed right into the thimble 20. The sleeve 12 is slipped onto member 14 and into the thimble 20. The nut 29 is screwed onto the portion 19 of the member 14 at a pre-determined distance from portion 18. The nut 29 is entered into the bore of the tube 11 and the grub screws 33 are screwed into the groove of the collar 23 so as to locate the collar 23 axially to the tube 11. The tool is located with the collar 112 around the cylinder 25 and the prong 114 is inserted into one of two holes 116 in the cylinder 25 and into one of two slots 117 in the portion 18.

This is the position in FIG. 2, and it will be seen that the end of the member 14 is clear of the tube 10.

To reach the position shown in FIG. 3 the thimble 20 and threaded member 14 are rotated by the tool. The rotation screws the portion 15 of the member 14 into the adjacent hole 34 until the face 13 of the sleeve 12 fits tight against the tube 10. The member 14 and sleeve 12 are thus locked in their final position.

The operation is completed, as shown in FIG. 4 by withdrawing the prong 114 from the slot 117, rotating the tool and thimble 20 in a direction to move it to the right until the collar 23 is trapped between the end of the thimble 20 and nut 29. At this position, location of the nut 29 on the threaded portion 19 brings the end of the tube 11 against or near the adjacent face of the thimble 20.

It will be seen from FIG. 4 that the tube 11, thimble 20, sleeve 12 and tube 10 form a smooth, neatly jointed assembly.

FIG. 6 is a view looking along the axis of the tube 10 to a position at which four tubes 11 are fastened rigidly to the tube by a mechanism described with reference to FIGS. 1 to 5.

It will be seen that the curved faces 13 of the sleeve 12 fit closely to the outside surface of the tube 10. It is particularly noteworthy that the four tubes 11 are enabled by the invention to be fastened rigidly in a single plane to the tube 10, since the fastening of the mechanism described above is acheived by access to the tube 11 and its associated mechanism only.

There is no requirement to use tools which pass diametrically through the tube 10.

FIG. 7 shows how the tube 11 may be fastened at an inclined position to the tube 10. A block 52 has one face shaped to fit against the surface of the tube 10, to which it is fastened by screw 53 into one of the tapped radial holes 34 in the tube 10. Block 52 has one or more inclined faces 54 into each of which is a tapped hole, normal to the face 54. As shown in FIG. 7, the sleeve 12 has a flat end face to fit the face 54. The tube 11 fastened to the block 52 by the same procedure as described above for fastening the tube 11 at right angles to the tube 10.

In FIG. 8 the arrangement shown in FIG. 7 is used, except that in place of the screw 53, the threaded member 14 has a longer threaded length 15, than described above so as to pass through the block 52 and screw into the relevant hole 34.

The tapped holes 34 can be utilised for fastening other components to the frame, such as panels, drawer runners or diagonal bracing members. Subsidiary support frames, such as those used for electronic equipment, may be drilled at appropriate points and screwed to the tapped holes.

Such demountable frames may be used on a smaller scale for toys for hobby purposes. Another use is for electrical lighting systems to support lights, booms, cables etc. The construction described may be used to connect one or more tubes to structural members such as flat bars or to nodes of spherical or polyhedral types.

For some applications it may be prefered not to tap the holes 3 but to use one of the known spring steel or other appropriate design of nut or fastener which may be pushed into a plain hole and which becomes fastened when a screw is screwed into it.

In FIG. 9 the holes 34 are tapped and the tube 11 has a tapered end 56. A plunger 57 is a sliding fit inside the tube 10 and has a co-axial threaded length 58. A relieved length of the plunger 57 receives the sleeve 12, as above.

Within the tube 11 the plunger 57 has an elongate annular depression 59 into which one or more grub screws 60 are screwed through the holes 34.

When the grub screws 60 are slackened, the plunger 57 can rotate and slide axially. Rotation of the plunger 57, by a bar inserted through a hole 61, screws the threaded length into one of the holes 34 in the tube 10 until the plunger 57 is locked to the tube 10 The grub screws 60 are then screwed in to lock the tube 11 to the plunger 57, and thus to the tube 10.

I claim:

1. A demountable frame including two spaced structural members each provided with a screw-threaded aperture, said spaced member arranged with each of said apertures aligned with and facing the other of said apertures at a predetermined distance apart and a transverse structural member extending between said spaced members, each end of said transverse member having a projection extending therefrom, each said projection comprising a pin having a screw-threaded portion at each end thereof and a shoulder intermediate said screw-threaded portions, the screw-threaded portion at the outer end of said pin engageable in a respective one of the apertures to locate said transverse member to the respective one of said spaced member, the pin of each of said projections being temporarily partially axially retractible into the respective end of said transverse member, thereby to reduce th overall length of said transverse member and said projections to less than said distance to permit said transverse member to be fitted between and removed from said two spaced members without moving them apart beyond said distance; a tubular spacer on said pin between the outer end thereof and said shoulder, said spacer having a length such that said spacer is gripped between the outer surface of the adjacent one of said spaced members and said shoulder when the screw-threaded portion at the outer end of said pin has been screwed tightly into the screw-threaded aperture of said one spaced member, the end of the spacer which abuts against the outer surface of said one spaced member having a shape complementary to the shape of said outer surface, said projection also including a locking thimble movable into screw-threaded engagement with the screw-threaded inner end of said pin, said thimble being movable on said screw-threaded inner end to a locking position in which said thimble engages against the respective end of said transverse member, said shoulder being accessible through an aperture in said thimble, whereby said pin is rotatable in one direction to effect disengagement from said aperture in said one spaced member and corresponding axial movement of said pin relatively to said transverse member to effect said temporary retraction and in the other direcion to engage said pin in said aperture in said one spaced member.

2. A demountable frame, as in claim 1, in which each of the two spaced members is formed with a row of said apertures, each aligned with and facing one of the apertures in the other of the two spaced members, whereby the transverse member may be located optionally at one of several locations along the two spaced members.

3. A demountable frame, as in claim 2, in which the apertures in each row are equally spaced.

4. A demountable frame, as in claim 3, in which the transverse member is formed with a row of apertures identical in size and spacing to the apertures in the two spaced members.

5. A demountable frame, as in claim 1, in which the two spaced and the transverse members are tubular.

6. A demountable frame, as in claim 5, including a plurality of said apertures symmetrically spaced in a plane normal to the axis of the member.

7. A demountable frame, as in claim 6, in which each tube is of circular cross-section and there are four apertures in the said plane.

8. A demountable frame, as in claim 6, in which each tube is of polygonal cross-section and in said plane there is one aperture in each face of the polygon.

9. A demountable frame, as in claim 1, including two of said transverse members extending from opposite sides of one of said two spaced members and the adjacent projections on two transverse members are coaxial.

10. A demountable frame, as in claim 6, in which each tube is of elliptical cross-section and there are four apertures in the said plane.

11. A demountable frame as claimed in claim 1 including, at each end of said transverse member, a collar through which the inner end of said pin is passed; retaining means securing each said collar to the respective end of said transverse member and an enlarged head portion at the inner end of each said pin, whereby said pin is retained from complete withdrawal through said collar.

12. A demountable frame as claimed in claim 11, in which said enlarged head portion at the inner end of each said pin is a nut in screw-threaded engagement with the screw-threaded portion at the inner end of said pin.

13. In a demountable frame as claimed in claim 1, a projection extending from an end of said transverse member, said projection comprising a pin having a screw-threaded portion at each end thereof and a shoulder intermediate said screw-threaded portions, the screw-threaded portion at the outer end of said pin engageable in a respective one of the apertures to locate said transverse member to the respective one of said spaced members, the pin of each of said projections being temporarily partially axially retractible into the respective end of said transverse member, thereby to reduce the overall length of said transverse member and said projections to less than said distance to permit said transverse member to be fitted between and removed from said two spaced members without moving them apart beyond said distance; a tubular spacer on said pin between the outer end thereof and said shoulder, said spacer having a length such that said spacer is gripped between the outer surface of the adjacent one of said spaced members and said shoulder when screw-threaded portion at the outer end of said pin has been screwed tightly into the screw-threaded aperture of said one spaced member, the end of the spacer which abuts against the outer surface of said one spaced member having a shape complementary to the shape of said outer surface, said projection also including a locking thimble movable into screw-threaded engagement with the screw-threaded inner end of said pin, said thimble being movable on said screw-threaded inner end to a locking position in which said thimble engages against the respective end of said transverse member, said shoulder being accessible through an aperture in said thimble, whereby said pin is rotatable in one direction to effect disengagement from said aperture in said one spaced member and corresponding axial movement of said pin relatively to said transverse member to effect said temporary retraction and in the other direction to engage said pin in said aperture in said one spaced member.

14. A projection as claimed in claim 13 including, at each end of said tranverse member, a collar, through which the inner end of said pin is passed; retaining means securing each said collar to the respective end of said transverse member and an enlarged head portion at the inner end of each said pin, whereby said pin is retained from complete withdrawal through said collar.

15. A projection as claimed in claim 14 in which said enlarged head portion at the inner end of each said pin is a nut in screw-threaded engagement with the screw-threaded portion at the inner end of said pin.

16. A demountable frame as claimed in claim 1 in which said tubular spacer has an outer cylindrical surface of a first diameter; said transverse member has an outer cylindrical surface of a second diameter greater than said first diameter and said locking thimble has a tapered outer peripheral surface having an end of smaller diameter equal to said first diameter and an end of larger diameter equal to said second diameter, thereby to provide a smooth transition between the outer peripheral surfaces of said tubular spacer and said transverse member.

17. A projection as claimed in claim 13 in which said tubular spacer has an outer cylindrical surface of a first diameter; said transverse member has an outer cylindrical surface of a second diameter greater than said first diameter and said locking thimble has a tapered outer peripheral surface having an end of smaller diameter equal to said first diameter and an end of larger diameter equal to said second diameter, thereby to provide a smooth transition between the outer peripheral surfaces of said tubular spacer and said transverse member.

* * * * *